Dec. 11, 1945.  A. VANG  2,390,971
WELDING METHOD
Filed Aug. 17, 1942  3 Sheets-Sheet 1

INVENTOR
Alfred Vang
BY Peter M. Boesen
ATTORNEY

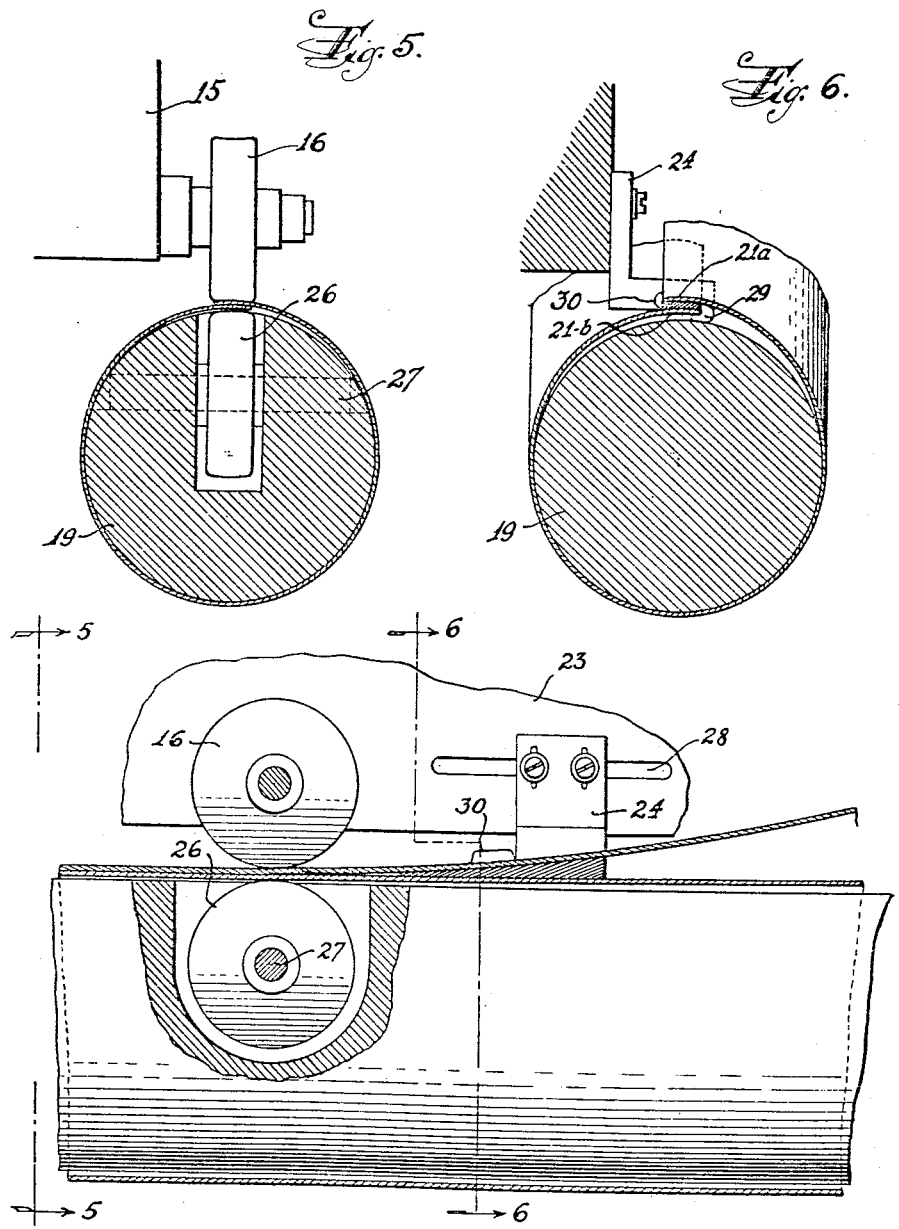

Dec. 11, 1945.  A. VANG  2,390,971
WELDING METHOD
Filed Aug. 17, 1942    3 Sheets—Sheet 3

INVENTOR
Alfred Vang
BY Peter A. Boesen
ATTORNEY

Patented Dec. 11, 1945

2,390,971

UNITED STATES PATENT OFFICE 2,390,971

WELDING METHOD

Alfred Vang, Newark, N. J., assignor to Continental Can Company, Inc., New York, N. Y.

Application August 17, 1942, Serial No. 455,077

4 Claims. (Cl. 219—10)

This invention relates to a method of welding thin walled cans and other vessels made of very thin steel plates, and more particularly it refers to a method of cleaning the surfaces to be joined by means of an electric arc. My invention, furthermore, is concerned with the use of high frequency, high voltage alternating current for creating an arc and thereby cleaning the surfaces to be welded, and with using direct current for making the welds, whereby a weld is obtained without disturbing the crystalline structure of the material all the way through the section to be welded.

The making of electric welds with thin gage sheets has long been an industrial problem of great importance. At the present time, it is of particular importance as a substitute for soldering. Such welding, however, is highly difficult to accomplish with satisfactory results and for this reason the welding of thin walled cans and vessels has not been very largely applied.

One of the most common difficulties in the welding of thin sheets has been that the arc will burn through the material and leave blow holes which, of course, is unsatisfactory for vessels that have to be water or air tight. This difficulty can be eliminated by proper timing, but there still remains the serious difficulty of controlling the welds in such a manner that the crystalline structure will not be completely disturbed and become brittle and break open in use. It is quite well known that in welding two sheets together the high temperature of the electric arc will cause the substance to melt and will cause grain growth in the sections of the material, affected by the high temperature. Thus when the material cools off it may be found that one part has large crystals and another part has small ones and the intervening crystalline structure is of such a character that the material becomes very brittle.

Another commonly occurring difficulty in the welding of thin sheet material has been the cleaning of the surfaces to be joined. In ordinary welding, this is not so critical because an excessive amount of heat can be applied which will automatically burn all organic material and will also oxidize the air and other impurities on the surface. When, however, thin sheets are welded the heat must be controlled very closely and no excessive amount of heat can be tolerated. It is, therefore, important that some other means be provided for cleaning the surfaces so as to make a uniform and satisfactory weld. In the present invention this has been accomplished by the use of a high frequency, high voltage alternating current arc.

The cleaning effect of the electric arc is useful in several ways. In the first place, it is used to immediately burn and evaporate any organic or liquid elements which may be deposited on the surfaces to be joined. In the second place, it is well known that the electric arc has a certain electrolytic effect. In the present application this is utilized to eliminate scale and other impurities which are imbedded in the surfaces to be joined. This phenomenon is most easily explained by assuming that the electric arc will draw streams of electrons out of the surfaces to be joined. These streams of electrons will collide with any articles or scale or other impurities which are imbedded in the surfaces. The collision of the electrons with the impurities will cause these to be knocked off the surface so that a completely clean surface will result, and the magnetic field which is present in the arc will have a tendency to throw the impurities to one side and a very satisfactory cleaning of the surface is obtainable in this way.

Finally, it should be noted that to obtain a good and satisfactory weld of thin materials it is necessary to apply extremely accurate timing. This means that the articles to be welded must pass through the arc at a high speed. To make this possible and to hold the surfaces to be joined in accurate relation to one another, I have developed what I call a "guiding key," the function of which is to guide the edges of two sheets to be welded together, in such a manner as to always obtain the same width of the weld and an accurate relation between the two edges. This "guiding key" is an important part of this invention and has a function which will be described more in detail hereafter.

Thus, the main object of this invention is to provide a method of welding thin sheets of metal together to form cans and other vessels.

Another object of this invention is to provide a means of welding thin sheets together by the use of high frequency, high voltage alternating current, to create an arc and to create a path for a direct current to perform the actual weld.

A further object of my invention is to utilize a high frequency current of sufficient voltage to ionize the path over which the direct current, used for welding, may travel, and by which the said direct current may be effectively controlled.

Still another object of my invention is to provide a method of cleaning surfaces to be welded by means of the electronic and electrolytic effects of the electric arc.

Other objects and advantages of the invention will be apparent during the course of the following description:

In the accompanying drawings, forming a part of this specification, and in which like numerals are employed to designate corresponding parts throughout the same, Figure 1 is a schematic diagram and side view of a welding apparatus embodying my invention.

Figure 4 is a sectional elevation of the welding head.

Figure 5 is an end view taken along the line 5—5 in Figure 4.

Figure 6 is a section taken along the line 6—6 in Figure 4.

Figure 10 is a greatly magnified section of the sheet to be welded, while

Figure 1:
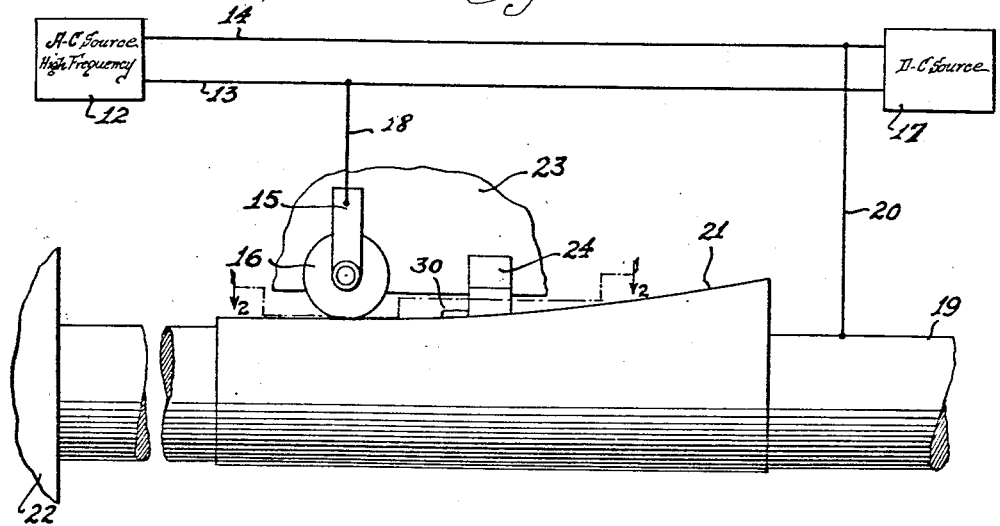
Figure 2:
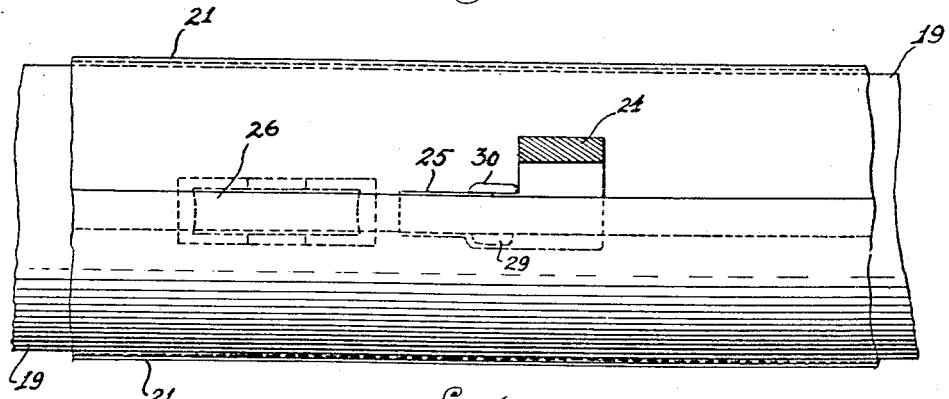
Figure 2 is a plan view taken along the line 2—2 in Figure 1.
Figure 3:
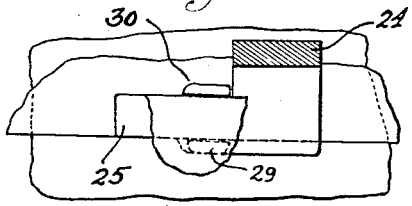
Figure 3 is a detail plan view, showing the guiding key in its relation to the sheet to be welded.

In the drawings, wherein for the purpose of illustration, is shown a preferred embodiment of my invention, the numeral 12 designates a source of high frequency and high voltage altrenating current. This source is connected by wires 13 and 14 to the welding head 15 having roller 16, and to the source 17 supplying direct current of low voltage but high amperage. The wire 13 is connected to the welding head by means of a wire 18, while the wire 14 is connected to the mandrel 19 by means of a wire 20.

The sheet to be welded is designated by numeral 21 and is bent around mandrel 19 as indicated in Figures 1, 2, 4, 5 and 6. The mandrel 19 is supported by a body 22, while the welding head 15 is supported by a body 23. The body 23 furthermore supports the arm 24 upon which is mounted the guiding key 25.

The mandrel 19 has a slot in which is mounted a lower roller 26 that is pivoted on a pin 27, as indicated in Figures 4 and 5. The upper roller 16 is concave, while the lower roller 26 is convex to fit the circular section of the seam, as indicated in Figure 5.

The element which I call "the guiding key" is best illustrated in Figure 4 where it is shown adjustably mounted by the arm 24 in slot 28 of the body 23. This guiding key is tapered toward the welding rollers 16 and 26 and provides a unique and important means of accurately holding the width of the weld and to bring the sheets together at the proper time. As will be described more fully hereafter, this is extremely important because of the necessity of obtaining the important cleaning effect of the electric arc which would not otherwise be possible due to the high speed at which the weld must be performed to prevent the burning of blow holes and unsatisfactory welds.

Figure 11:
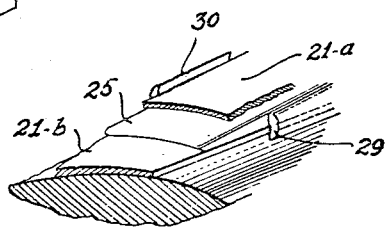
Figure 11 is a perspective view of the guiding key in relation to the sheets to be welded.

The guiding key provides means for holding the sheets to be welded in accurate relation to one another by means of two grooves or recesses, one designated by numeral 29 for the lower sheet, and the other designated by the numeral 30 for the upper sheet to be welded, see Figures 6 and 11. In the present case the sheets to be welded have been shown as a shell 21 consisting of one piece curved around the mandrel 19 and with its two opposite edges 21a and 21b to be welded together in a narrow seam, see Figures 6 and 11. Due to the thin cross-section of this sheet such as used for instance in cans containing canned food where the sheet is usually on the order of .010" thickness, ordinary welding methods are not suitable. As stated supra, it is necessary to perform the weld at great speed so as to prevent burning and so as to provide perfectly watertight and air-tight joints. It is also important that the material in the weld should not become brittle and break due to grain growth caused by over-heating and cooling. It is well known from the metallurgy of steel that if overheated the crystalline structure of the seal will show very marked changes because the crystals will be enlarged by so-called grain growth. This will always be followed by a very marked decrease in tensile strength of the material and the reduction in its modulus of elasticity which, of course, means that the material becomes brittle and will easily break.

Figure 10:
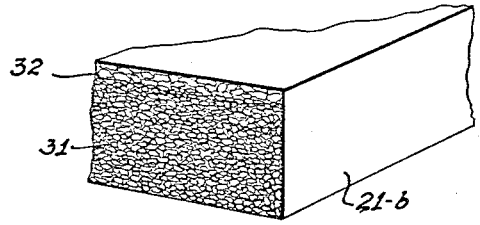

To insure welds which will maintain the full strength of the material, I have provided the particular type of welding hereinafter described, as well as the guiding key which permits the welding to be carried out at great speed, thereby preventing overheating and c o n s e q u e n t i a l changes in the crystalline structure of the seal. This has been indicated in the greatly magnified section of the material shown in Figure 10, where the lower part of the cross-section designated by numeral 31 shows the ordinary crystalline structure of the material, while the upper portion of the section designated by numeral 32 indicates the larger crystals resulting from the effect of the weld. It should be noted that in ordinary welds the enlarged crystals indicated at the top layers 32 in Figure 10, would extend through the entire section and would accordingly make the cross-section brittle. In the present case, however, the welding is carried out so quickly that only a few layers of crystals near the face of the weld are affected, as indicated in Figure 10. This is of the greatest importance in insuring satisfactory welds, having the full strength of the material after the weld has been completed.

Figure 7:
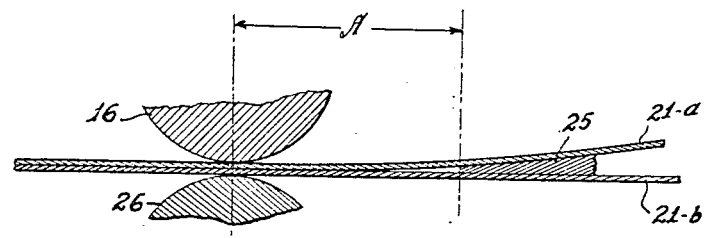
Figure 7 is a sectional elevation of the welding head with the guiding key in one position.
Figure 8:
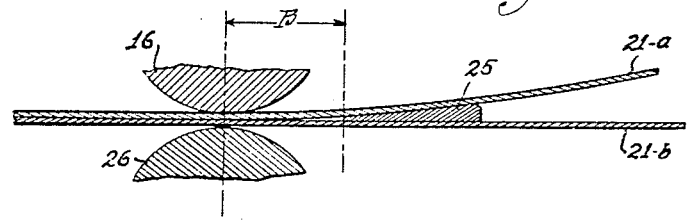
Figure 8 is a sectional elevation with the welding head in another position.
Figure 9:
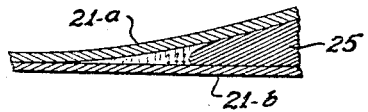
Figure 9 is an enlarged section of a portion of the incompleted weld showing the arc.

A further feature of my invention is indicated in Figures 7, 8 and 9 where the tip of the guiding key is shown in different positions as indicated by the dimensions A and B in Figures 7 and 8. The guiding key 25 is tapered toward the welding rollers 16 and 26, as indicated in Figures 7, 8 and 9, and as illustrated in these figures the adjustment of this guiding key to a varying distance away from the welding rollers, provides a varying degree of air gaps between the tip of the guiding key 25 and the said rollers. These air gaps are of considerable importance because they are used for the important and novel method of cleaning of the surfaces to be joined, as mentioned supra. The high frequency, high voltage alternating current maintains an arc from one of the sheets to be welded to the other (21a to 21b) across this air gap, and the length of this air gap in conjunction with the speed of travel of the article to be welded will determine the amount of cleaning and preheating which will be obtainable with a certain arc. In general it may be stated that a greater distance A, as shown in Figure 7, will provide a high degree of cleaning and preheating at a given speed.

The operation of my invention has been described in part above, but may be summarized as follows: My method of welding depends upon a new and novel method of using the electric arc created by the high frequency, high voltage, alternating current source to obtain several objects. In the first place, this arc effects the cleaning of the surfaces to be joined, as mentioned supra. Said cleaning depends upon the fact that the arc will draw streams of electrons from the surfaces to be joined and these electrons will collide with any dirt particles or any moisture particles or impurities of any kind which may be present on the surfaces to be joined. Thus, these electron collisions will cause the impurities to be torn away from the surfaces and blown into the air where the magnetic effect of the arc as well as the blowing effect of the rapidly expanding air will cause the impurities to be blown away from the surfaces. In addition there is also the electrolytic effect which furthermore helps to accomplish this purpose.

The second and still more important function of the electric arc, as used in the present invention, is to furnish an ionized path for the low voltage, direct current to follow and whereby said low voltage, direct current may be controlled. It is well known that it is difficult to control a low voltage current of high amperage because of the large current to be broken with resulting arcing, etc. In the present case, I, therefore, utilize the high voltage, high frequency alternating current to ionize the path between the two sheets to be welded, thereby furnishing a conductive path across which the low voltage direct current may pass and making possible the use of the direct current both for welding and preheating. It is easily seen that the D. C. will follow the ionized path and will flow across even a small air gap as long as the air remains ionized. As soon as the ionization is eliminated, however, the direct current will stop flowing through the air gap illustrated in Figure 9 and will merely flow through the work pieces. It is also will known that an alternating current of the type herein described is easily controlled by means of electronic devices such as for instance described in my patent application filed January 15, 1941, Serial No. 374,429. Because of this facility of controlling the alternating current, I have used this as a means in the present case of also controlling the direct current. In this manner I obtain electronic switching of the direct current as well, and I may thus apply the direct current instantaneously and I may cut off the same at any moment, and I may also work on only one part of an alternating current cycle as is well known in the application of electronic switching.

The third and equally important principle involved in the present invention is to be found in the guiding key by which the air gap is regulated and by which the same is accurately proportioned and controlled as hereinabove described. The air gap created by the tapered end of the guiding key, as indicated in Figure 9, permits the effective cleaning of the surfaces to be joined as well as an accurate control of the arcing and following preheating of the surfaces to be joined. The arcing in this air gap is indicated in Figure 9 in front of the tip of the guiding key 25. By means of this guiding key and the various elements controlled by the same, as described supra, it is thus possible to greatly speed up the making of welds and thereby increase the production of the welding articles as well as making more uniform and more satisfactory welds possible.

It is to be understood that the form of my invention, herewith shown and described, is to be taken as a preferred example of the same and that various changes in the shape, size and arrangement of parts may be resorted to, without departing from the spirit of my invention or the scope of the subjoined claims.

Having thus described my invention I claim:

1. A method of welding a lap seam of extremely thin weldable metal sheets, consisting in moving the superimposed thin metal sheets, which are to form the lap seam, in the same direction and at the same speed and at a small acute angle to each other so that the adjacent surfaces of said sheets touch when passing a relatively stationary line, pressing said moving sheets together along said stationary line, inducing a high voltage, high frequency alternating current to arc in the air gap adjacent said line, and inducing a low voltage high amperage current to flow through said arc for welding said adjacent surfaces at said stationary line.

2. A method of welding a lap seam of extremely thin weldable metal sheets, consisting in moving the superimposed thin metal sheets which are to form the lap seam, in the same direction and at the same speed and at a small acute angle to each other, so that the adjacent surfaces of said sheets touch when passing a relatively stationary line, pressing said moving sheets together along said stationary line, inducing a high voltage high frequency alternating current to arc in the air gap adjacent said line, and inducing a low voltage high amperage current to flow through said arc for welding said adjacent surfaces at said stationary line, and moving said sheets at a sufficient speed to reduce deterioration of said metal sheets due to the welding heat.

3. A method of welding a lap seam of extremely thin weldable metal sheets, consisting in moving the superimposed thin metal sheets, which are to form the lap seam, in the same direction and at the same speed and at a small acute angle to each other so that the adjacent surfaces of said sheets touch when passing a relatively stationary line, pressing said moving sheets together along said stationary line, inducing a high voltage high frequency alternating current to arc in the air gap adjacent said line, and inducing a low voltage high amperage current to flow through said arc for welding said adjacent surfaces at said stationary line, and varying said acute angle for controlling the arcing gap.

4. A method of welding a lap seam of extremely thin weldable metal sheets, consisting in moving the superimposed thin metal sheets, which are to form the lap seam, in the same direction and at the same speed and at a small acute angle to each other so that the adjacent surfaces of said sheets touch when passing a relatively stationary line, pressing said moving sheets together along said stationary line, inducing a high voltage high frequency alternating current to arc in the air gap adjacent said line, and inducing a low voltage high amperage current to flow through said arc for welding said adjacent surfaces at said stationary line, and confining said arcing gap to a small compass.

ALFRED VANG.